Nov. 20, 1962 S. C. BAKER 3,064,676
HYDRAULIC FLOW CONTROL VALVE
Filed Sept. 1, 1959
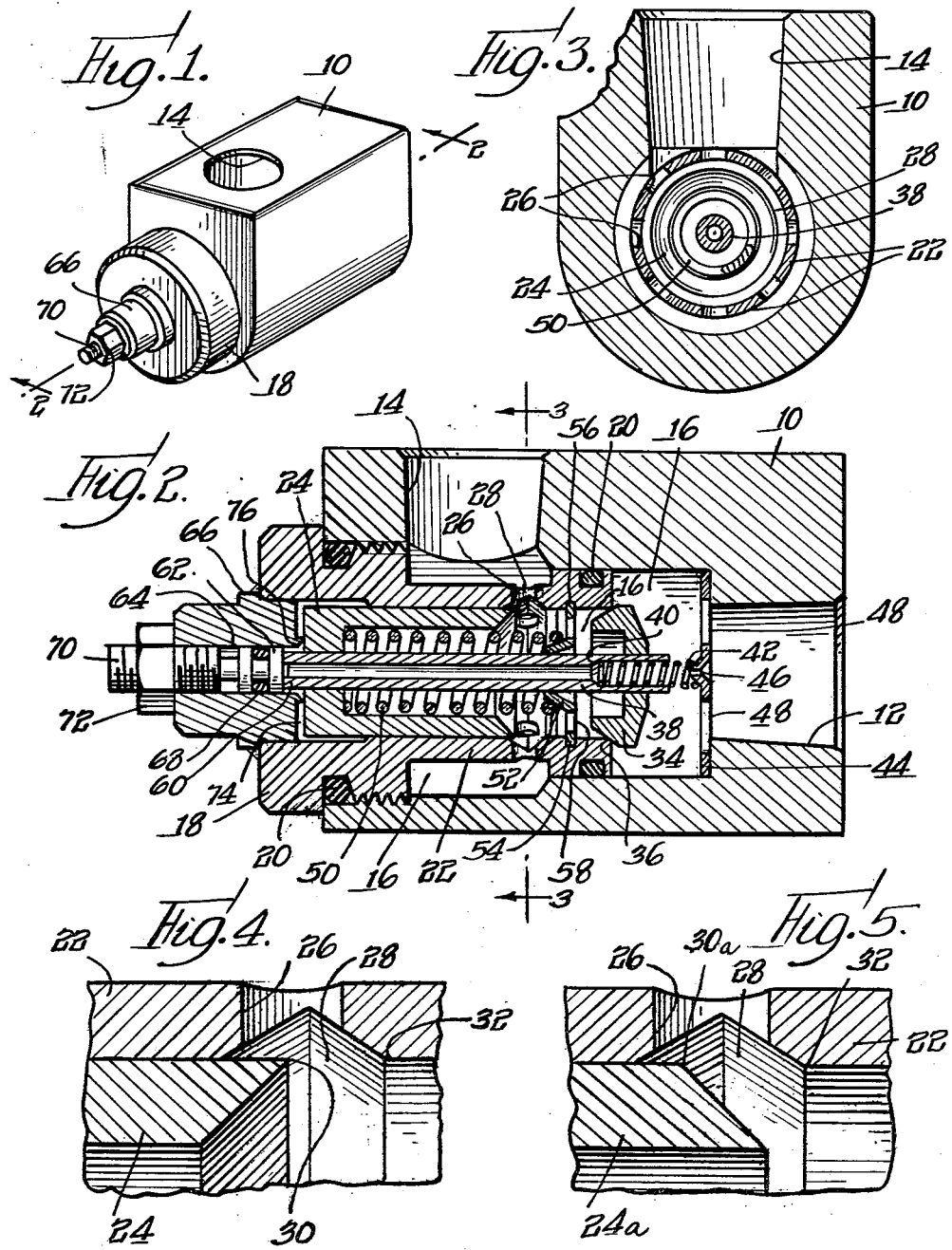
INVENTOR.
Stephen C. Baker
BY
Olson & Trexler
attys United States Patent Office 3,064,676
Patented Nov. 20, 1962

3,064,676
HYDRAULIC FLOW CONTROL VALVE
Stephen C. Baker, Hinsdale, Ill.
(1611 S. Newberry Ave., Chicago, Ill.)
Filed Sept. 1, 1959, Ser. No. 837,441
8 Claims. (Cl. 137—501)

My invention relates generally to hydraulic valves and more particularly to hydraulic valves which are intended to deliver selected, accurately controlled rates of flow.

A well known problem with hydraulic flow-control valves is the erratic performance experienced under certain flow conditions, variations from the required rate in excess of 30% having been observed. Obviously, the accuracy of control available under such circumstances is far from ideal.

I have discovered that, when a piston is employed to regulate flow by partially obstructing one or more ports, the shape of the leading edge of the piston influences the uniformity of flow and, accordingly, the accuracy of control. Between the leading edge of the piston and the unobstructed edge of each port, an area of restricted flow occurs; and when the leading edge of the piston has, in accordance with customary practice, been fashioned to be precisely square, a low pressure region tends to develop within the area defined by the leading edge of the piston.

The reduced pressure in such an area tends to attract or unbalance the piston toward the unobstructed edge of the port, and an undirected restriction of the port is consequently realized.

Therefore, an important object of my invention is to provide an improved hydraulic valve which overcomes the limitations of the prior art by controlling the development of low pressure regions in the vicinity of the leading edge of the regulating piston.

Another object of the invention is to provide an improved hydraulic flow control valve which is characterized by accurate delivery.

Still another object of my invention is to provide a hydraulic flow control valve which is adjustable to deliver a wide range of substantially constant rates of flow.

I have also discovered that, under certain circumstances, it is worthwhile to encourage the development of a reduced pressure region within the area defined by the leading edge of the regulating piston. For example, it is sometimes desired to incorporate a flow control valve in a hydraulic system wherein the valve will be responsive to the velocity of fluid flow. In such circumstances, I have observed that encouraging the development of a reduced pressure region within the area defined by the leading edge of the piston results in a modulating effect, i.e. the rate of fluid flow tends to decrease as the pressure and velocity of the fluid increase.

Accordingly, a further object of my invention is to provide an improved hydraulic valve which is velocity responsive.

Further objects and features of the invention pertain to the particular structure and arrangements whereby the above objects are obtained.

The structure in accordance with my invention includes a valve shell having an inlet and an outlet, flow regulating means adapted to adjust the rate of flow to desired values, and pressure compensating means including a piston having a tapered leading edge adapted to cooperate with an annular groove having bevelled sides and opening through ports disposed thereabout.

The invention, both to its structure and mode of operation, will be better understood by reference to the following disclosure and drawing forming a part thereof, wherein:

FIG. 1 is a perspective view of a hydraulic flow control valve constructed in accordance with my invention;

FIG. 2 is a view through the section 2—2 of FIG. 1;
FIG. 3 is a view through the section 3—3 of FIG. 2;
FIG. 4 is an enlarged, fragmentary, cross-sectional view of the hydraulic valve arrangement of FIG. 1 showing the leading edge of the regulating piston and a cooperating port;
FIG. 5 is an enlarged, fragmentary, cross-sectional view of a second embodiment of the regulating piston shown with a cooperating port, which embodiment is particularly adapted for use in a modulating valve.

Referring now in detail to the drawing, a valve shell or housing 10 is shown to include an inlet 12 and an outlet 14. These valve openings may be conveniently tapped to facilitate joining the valve shell or housing to the threaded ends of hydraulic lines, not shown. Within the housing 10 there is a valve chamber or passage 16 interconnecting the inlet 12 and outlet 14. It is important to point out that the inlet and the outlet preferably communicate with chamber 16 at substantially right angles to each other, the outlet being connected to chamber 16 at substantially the mid-portion thereof.

A valve head 18 is threadedly mounted to housing 10 opposite to the inlet 12 and closing off the valve chamber 16. Sealing of the joint between head 18 and housing 10 may be effected by the employ of rubber O-rings 20 or other suitable gasketing members. As will be recognized, shell 10 may be installed in a hydraulic system and head 18 may be removed therefrom or replaced for any of a number of reasons without requiring the complete dismantling of the system.

Valve head 18 is fashioned with an extended portion or sleeve 22 which enters chamber 16 and slidably receives a hollow, cylindrical piston 24. Sleeve 22 interposes a number of circumferentially spaced ports 26 in the flow path between chamber 16 and outlet 14. Sleeve 22 further is provided with an internal, annular recess 28 which is disposed in communication with the ports 26. Advantageously, recess 28 is provided with beveled sides intersecting in a radially outward direction, the intersect of these beveled sides preferably being spaced-apart in an upstream direction from a line joining the centers of ports 26. A recess having 30° bevels has been found to be widely useful.

Piston 24 is adapted to maintain a constant flow of fluid by variably obstructing recess 28. In accordance with a feature of the invention, the open end of piston 24 displays a sharpened terminal portion or knife edge 30 to the annular recess 28. One satisfactory means of providing the edge 30 is to fashion the open end of piston 24 to define internally a truncated conical surface whose major diameter equals the outside diameter of the piston. By having the open end of piston 24 inwardly tapered from a leading edge, I am able to discourage the development of a low pressure region within the area defined by the leading edge of the piston.

I have found that the optimum amount of taper to be provided at the open end of piston 24 depends, to a degree, upon the particular flow rate or rates involved in each specific situation. However, a taper of approximately 45° has proved useful for a wide range of flow rates, incurring only small inaccuracies due to reduced pressure regions unbalancing the piston.

While providing piston 24 with an inwardly tapered leading edge, as shown in FIG. 4, has proved advantageous under many conditions, I have found it equally advantageous to provide piston 24 with an outwardly tapered leading edge, as shown in FIG. 5, when a modulating valve is desired. The outward taper may be appropriately provided by fashioning the open end of the piston to define externally a truncated conical surface whose major diameter equals the outside diameter of the piston. This arrangement encourages the development of a low pressure region within the area defined by a leading edge 30a of a piston 24a (FIG. 5).

A taper of approximately 140° has proved generally useful under various flow conditions when velocity response or modulation is desired.

In order to adjust the rate of flow, I provide a poppet valve 34 which is arranged to close against a valve seat 36 located on the inwardly disposed end portion of valve head 18. Poppet valve 34 is secured at one end of a hollow tube 38, tube 38 being provided with an internal shoulder 40 for seating a biasing spring 42. The strength of spring 42 is selected so that, in the absence of inlet fluid pressure, poppet valve 34 is not closed tightly against seat 36. A spider 44 extends across inlet 12 and has a centrally apertured, upraised mid-portion 46 which acts as a locater for spring 42.

Spider 44, in addition to having the small central aperture in mid-portion 46, is provided with a number of other, larger apertures or holes 48 which permit passage of hydraulic fluid from inlet 12 to chamber 16.

In order to provide bias and damping for piston 24, I include a coiled spring 50 which is confined between the closed end of piston 24 and a spring locater 52 which is integral with a snap ring 54. Snap ring 54 is, in turn, mounted in a groove 56 formed in sleeve 22. Snap ring 54 incorporates a number of radially disposed apertures 58 adapted to pass hydraulic fluid.

The hollow tube 38 extends slidably through the closed end of piston 24 in order that its slotted end 60 may abut a positionable plunger 62. Plunger 62 is slidably mounted in the central bore 64 of a cap element 66 that is copper brazed or otherwise suitably fastened to valve head 18, plunger 62 being sealed against leakage of fluid with a rubber O-ring 68 or other suitable gasketing means. A threaded stud 70 engages the bore 64 adjustably to locate plunger 16 and, consequently, poppet valve 34. A jam-nut 72 is provided to secure stud 70 in position.

From the descriptions thus far given, it is apparent that, assuming the valve has been regulated to the desired flow rate the flow path can be defined as follows. Fluid passing through the inlet 12 enters the chamber 16 through apertures 48, passing thence around the poppet valve 34, across the valve seat 36, through the holes 58 in snap ring 54, and into outlet 14 through the ports 26. The volume of fluid flowing is, of course, regulated by positioning poppet valve 34 through stud 70.

It is important to note that fluid also passes through the aperture in mid-portion 46 and through holes 48 into the bore of tube 38 and thence through the slotted end 60 into a chamber 74 which is defined between the closed end of piston 24 and cap 66, cap 66 being provided with projections 76 in order to insure the existence of chamber 74.

Provision of this latter fluid path tends to balance piston 24 enabling my valve to compensate automatically for disparities in fluid pressure between inlet 12 and outlet 14. If, for example, the inlet pressure momentarily exceeds the outlet pressure, the flow path associated with tube 38 will cause the resultant pressure differential to appear across the closed end of piston 24. In response, piston 24 will be urged further to obstruct ports 26; and the desired rate of flow will be maintained irrespective of the increased pressure. It will become apparent that piston 24 also compensates for the converse situation.

Thus balanced against the existence of a pressure differential between the inlet and the outlet and being arranged to control the development of low pressure regions within the area defined by the leading edge of the regulating piston, it will become apparent that my hydraulic flow control valve is capable of providing accurately controlled rates of flow.

Accordingly, the particular embodiments of the invention which have been shown should be understood as not limiting the invention. Many modifications may be made, and it is contemplated to cover by the appended claims any such modifications as fall within the true spirit and scope of the invention.

The invention is claimed as follows:

1. A hydraulic flow-control valve comprising: a housing having an inlet, a valve chamber communicating coaxially with said inlet, and an outlet communicating at right angles with said chamber at substantially the mid-portion thereof; a valve head threadedly engaging said housing and forming within said housing sleeve means having a plurality of circumferentially spaced ports communicating said chamber with said outlet, said sleeve means further having an annular recess disposed about an internal circumference in communication with said ports, said recess having beveled sides intersecting in a radially outward direction, the line of said intersect being spaced-apart from a line connecting the centers of said ports; pressure compensating means including a hollow, cylindrical piston slidably arranged within said sleeve means, said piston having a closed end and an open end, the terminal portion of said open end defining a truncated conical surface whose major diameter equals the outside diameter of said piston, said terminal portion being arranged to obstruct said ports selectively; a hollow tube having a slotted end extending slidably through the closed end of said piston; and flow regulating means including a valve seat fixed within said chamber facing said inlet, a spring-biased poppet valve mounted on said tube opposite to its slotted end and tending to close said valve seat, and a plunger axially adjustably threadedly engaging said valve head and abutting the slotted end of said tube in order to operate said poppet valve.

2. A hydraulic flow-control valve comprising: a housing having an inlet, a valve chamber communicating coaxially with said inlet, and an outlet communicating at right angles with said chamber at substantially the mid-portion thereof; a valve head threadedly engaging said housing and forming within said housing sleeve means having a plurality of circumferentially spaced ports communicating said chamber with said outlet, said sleeve means further having an annular recess disposed about an internal circumference in communication with said ports, said recess having beveled sides intersecting in a radially outward direction, the line of said intersect being spaced-apart from a line connecting the centers of said ports in an upstream direction; pressure compensating means including a hollow, cylindrical piston slidably arranged within said sleeve means, said piston having a closed end and an open end, the terminal portion of said open end defining a truncated conical surface whose major diameter equals the outside diameter of said piston, said terminal portion being arranged to obstruct said ports selectively; a hollow tube having a slotted end extending slidably through the closed end of said piston; and flow regulating means including a valve seat fixed within said chamber facing said inlet, a spring-biased poppet valve mounted on said tube opposite to its slotted end and tending to close said valve seat, and a plunger axially adjustably threadedly engaging said valve head and abutting the slotted end of said tube in order to operate said poppet valve.

3. In a valve for supplying substantially constant rates of fluid flow, the combination comprising: a valve body defining a fluid passageway; orifice means in said passageway defining an annular groove having beveled sides and at least one port opening radially from said groove; and pressure compensating means in said valve body including a piston slidably operable in said passageway, said piston having a sharpened leading edge cooperably disposed with respect to said groove for selectively obstructing said groove and closing off said port, said sharpened leading edge cooperating with the beveled sides of said groove to control fluid forces tending to urge said piston to close said port.

4. In a valve for modulating fluid flow, the combination comprising: a valve body defining a fluid passageway;

orifice means in said passageway defining an annular groove having beveled sides and at least one port opening radially from said groove; and pressure compensating means in said valve body including a piston slidably operable in said passageway, said piston having an outwardly tapered, sharpened leading edge cooperably disposed with respect to said groove for selectively obstructing said groove and closing off said port, said outwardly tapered, sharpened leading edge cooperating with the beveled sides of said groove to amplify fluid forces tending to urge said piston to close said port.

5. In a valve for supplying substantially constant rates of fluid flow, the combination comprising: a valve body defining a fluid passageway; orifice means in said passageway defining an annular groove having bevelled sides intersecting in a radially outward direction and at least one port opening radially from said groove; and pressure compensating means in said valve body including a piston slidably operable in said passageway, said piston having an inwardly tapered, sharpened leading edge cooperably disposed with respect to said groove for selectively obstructing said groove and closing off said port, said inwardly tapered, sharpened leading edge cooperating with the beveled sides of said groove to minimize fluid forces tending to urge said piston to close said port.

6. A hydraulic flow-control valve comprising: a housing having an inlet orifice, a valve chamber open to said inlet orifice, and an outlet orifice open to said chamber at substantially right angles to said inlet orifice; cylindrical sleeve means in said housing having a plurality of circumferentially spaced, radial ports communicating said chamber with one of said orifices, said sleeve means further having an annular recess disposed about an internal circumference in communication with said ports, said recess having bevelled sides intersecting in a radially outward direction; and pressure compensating means including a hollow, cylindrical piston slidably arranged within said sleeve means, said piston having an open end defining a truncated conical surface terminating in a knife edge, the major diameter of said surface equaling the outside diameter of said piston, the terminal knife edge of said surface selectively obstructing said recess for throttling the flow of hydraulic fluid through said valve, said truncated conical surface cooperating with said bevelled sides in minimizing the effect of fluid forces on said piston.

7. A hydraulic flow control valve according to claim 6 wherein said bevelled sides intersect at a line spaced-apart from a line connecting the centers of said ports.

8. A hydraulic flow control valve according to claim 6 wherein said bevelled sides intersect at a line spaced-apart in an upstream direction from a line connecting the centers of said ports.

References Cited in the file of this patent

UNITED STATES PATENTS

| | | |
|---|---|---|
| Re. 24,580 | Hodgson | Dec. 23, 1958 |
| 1,923,595 | Temple | Aug. 22, 1933 |
| 2,234,932 | Schlaupitz | Mar. 11, 1941 |
| 2,502,092 | Jessup | Mar. 28, 1950 |
| 2,670,761 | Fegel | Mar. 2, 1954 |
| 2,973,778 | Baker | Mar. 7, 1961 |

FOREIGN PATENTS

| | | |
|---|---|---|
| 116,957 | Sweden | of 1946 |